(12) United States Patent
Larsson et al.

(10) Patent No.: US 10,701,922 B1
(45) Date of Patent: Jul. 7, 2020

(54) LIGHTED FISHING POLE HOLDER

(71) Applicants: John L. Larsson, Orange Beach, AL (US); Clinton Herrin, Robertsdale, AL (US)

(72) Inventors: John L. Larsson, Orange Beach, AL (US); Clinton Herrin, Robertsdale, AL (US)

( * ) Notice: Subject to any disclaimer, the term of this patent is extended or adjusted under 35 U.S.C. 154(b) by 0 days.

(21) Appl. No.: 16/053,908

(22) Filed: Aug. 3, 2018

(51) Int. Cl.
A01K 97/10 (2006.01)
F21V 23/00 (2015.01)
F21V 23/04 (2006.01)
F21S 41/141 (2018.01)
F21W 107/20 (2018.01)
F21Y 115/10 (2016.01)
F21W 104/00 (2018.01)

(52) U.S. Cl.
CPC ............ A01K 97/10 (2013.01); F21S 41/141 (2018.01); F21V 23/003 (2013.01); F21V 23/0435 (2013.01); F21W 2104/00 (2018.01); F21W 2107/20 (2018.01); F21Y 2115/10 (2016.08)

(58) Field of Classification Search
CPC .... A01K 97/10; F21S 41/141; F21V 23/0435; F21V 23/003; F21W 2104/00; F21W 2107/20; F21Y 2115/10
See application file for complete search history.

(56) References Cited

U.S. PATENT DOCUMENTS

| 2,127,790 | A | * | 8/1938 | Smoot | A01K 97/10 248/316.1 |
| 2,430,112 | A | * | 11/1947 | Hamre | A01K 97/10 224/406 |
| 2,704,411 | A | * | 3/1955 | Carroll | A01K 97/10 43/17 |
| 2,720,048 | A | * | 10/1955 | Bracey | A01K 97/10 43/17 |
| 4,240,221 | A | | 12/1980 | Komarnicki | |
| 4,925,148 | A | | 5/1990 | Newton et al. | |
| 4,972,622 | A | | 11/1990 | Fuchs | |
| 5,335,149 | A | | 8/1994 | Evans | |
| 5,469,342 | A | * | 11/1995 | Chien | A42B 1/242 224/660 |
| D434,101 | S | | 11/2000 | Allen | |
| 8,695,268 | B2 | | 4/2014 | Gouthro et al. | |
| 10,279,877 | B1 | * | 5/2019 | Allen | B63B 29/04 |
| 2001/0036082 | A1 | * | 11/2001 | Kanesaka | B60Q 7/00 362/555 |
| 2012/0204469 | A1 | | 8/2012 | Kowalski et al. | |
| 2014/0165448 | A1 | | 6/2014 | Gouthro et al. | |
| 2015/0230447 | A1 | | 8/2015 | Keossian | |

(Continued)

Primary Examiner — Evan P Dzierzynski
(74) Attorney, Agent, or Firm — Peter Loffler

(57) ABSTRACT

A lighted fishing pole holder is attached to the gunwale of a boat and has a top mount that is attached to the gunwale in the usual way. A transparent or translucent fishing pole receiving tube member depends downwardly from a central opening of the top mount below the gunwale. A light strip is attached to an outer surface of the tube member with its lights directed into the tube member. The lights of the light strip are connected to the boat's electrical system or to a battery and provide lighting into the tube member which is directed out through the central opening of the top mount. A remote control can control various operations of the lights.

4 Claims, 4 Drawing Sheets

(56) References Cited

U.S. PATENT DOCUMENTS

2015/0276203 A1* 10/2015 McBee ............... F21V 33/0008
362/465
2015/0377549 A1 12/2015 Cai et al.
2016/0021861 A1 1/2016 Pippins

* cited by examiner

LIGHTED FISHING POLE HOLDER

BACKGROUND OF THE INVENTION

1. Field of the Invention

The present invention relates to a gunwale mounted fishing pole holder wherein the tube of the fishing pole holder has a series of user controlled lights.

2. Background of the Prior Art

Gunwale mounted fishing pole holders are a common site on many recreational and small commercial fishing boats. Such fishing pole holders generally comprise a top mount having a central opening. The top mount sits on the gunwale, either protruding upwardly therefrom, or generally flush mounted with the gunwale, with the mount secured to the gunwale in appropriate fashion, such as via screws. A tube member depends downwardly from the top mount and down below the gunwale, angled with respect to the top mount, anywhere from zero degrees to about thirty degrees or so. The bottom of the tube member can be partially open or completely closed. The butt end of a fishing pole passes through the central opening of the top mount and is received within the tube member sitting on the bottom thereof. The tube member is sufficiently deep so that should a fish bite on the line of the fishing pole, the fishing pole will not be pulled out of the fishing pole holder in most instances. Such fishing pole holders are typically made from stainless steel, aluminum, ABS plastic or some combination thereof.

Such fishing pole holders are very convenient as the fishermen can install fishing poles all around the boat in such holders and tend to other tasks—such as drinking beer—while waiting for one of the fishing poles to register a bite. Although highly functional, such fishing pole holders offer little else to the boat owner or his or her passengers.

What is needed is a system that enhances the functionality of a typical gunwale mounted fishing pole holder so that the holder has utility above and beyond holding a fishing pole that is awaiting a bite on the line thereof. Such a system must be easy to use so as to not complicate the overall fishing experience.

SUMMARY OF THE INVENTION

The lighted fishing pole holder of the present invention addresses the aforementioned needs in the art by augmenting a traditional gunwale mounted fishing pole holder with a lighting system that enhances the aesthetics of the fishing pole holder, especially at night, so as to entertain the passengers of the fishing vessel. The lighted fishing pole holder is of relatively simple design and construction, being produced using standard manufacturing techniques, so that the device is relatively inexpensive to produce, making the device economically attractive to potential consumers for this type of device. Installation of the lighted fishing pole holder is relatively straightforward as is usage of the device.

The lighted fishing pole holder of the present invention is comprised of a top mount that has an upper surface, a lower surface, and a central opening. The lower surface of the top mount is attached to a gunwale of a boat, sitting on the gunwale or recessed therein for a generally flush mount securement. A transparent or translucent tube member has a top, a bottom, an outer surface, and an inner surface. The top of the tube member is attached to the lower surface of the top mount and is aligned with the central opening so that a fishing pole can pass through the central opening of the top mount and be received within the tube member. A light strip has a series of lights thereon and is attached to the outer surface of the tube member so that the series of lights faces into the tube member. The light strip is connected to a source of electrical power (such as the boat's electrical system or to a battery) for powering the lights. Advantageously, the light strip is flexible. Each of the series of lights is an LED light. A control box is electrically connected to the light strip (located along the electrical cable used to connect the light strip to its source of electrical power). The control box controls operation of the series of lights via one or more control signals. A remote control wirelessly communicates with the control box such that the remote control wirelessly sends remote signals to the control box for issuing the one or more control signals.

BRIEF DESCRIPTION OF THE DRAWINGS

Similar reference numerals refer to similar parts throughout the several views of the drawings.

DESCRIPTION OF THE PREFERRED EMBODIMENT

Figure 1:
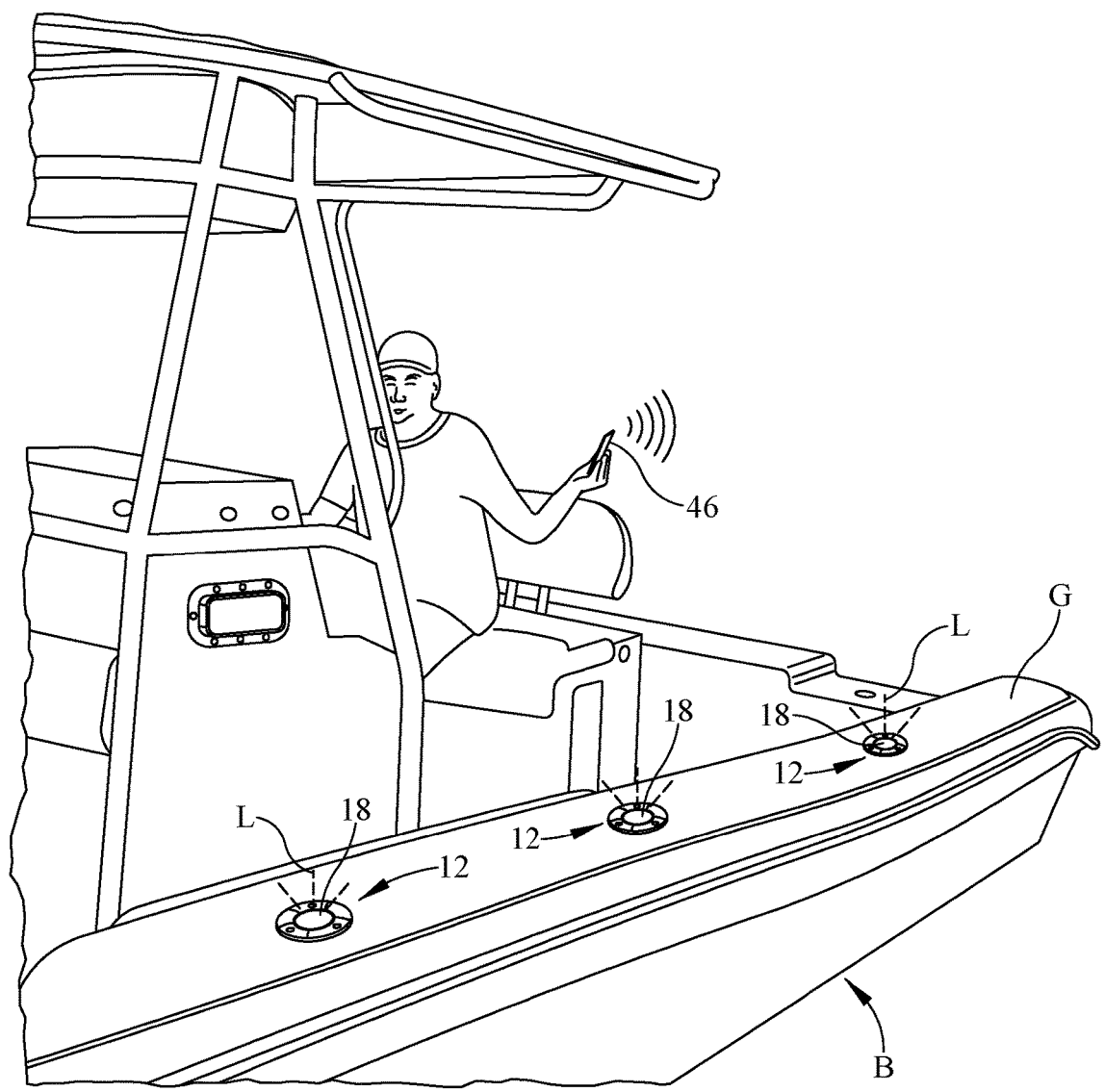
FIG. 1 is an environmental view of the lighted fishing pole holder of the present invention installed within a gunwale of a boat.
Figure 2:
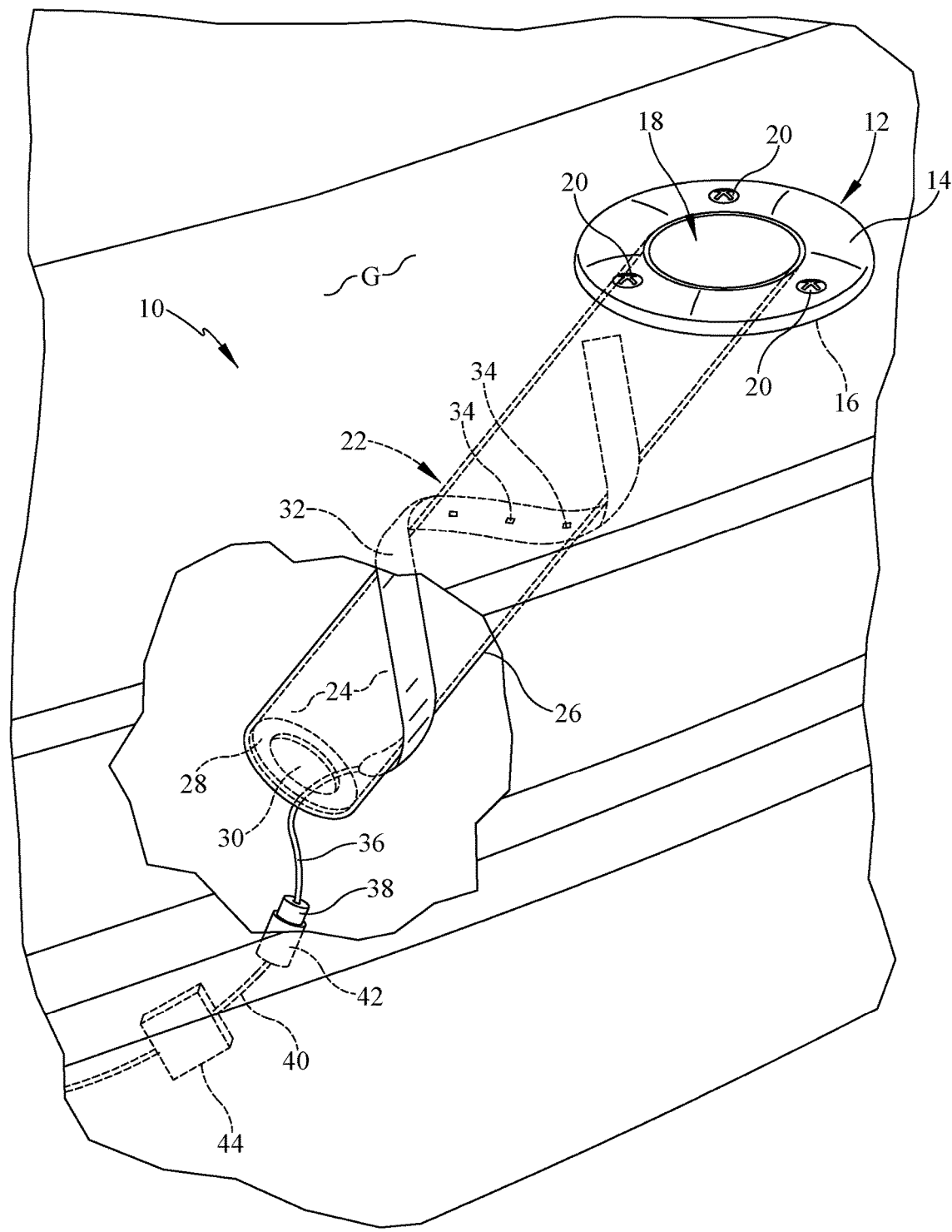
FIG. 2 is a close-up perspective view of the fishing pole holder installed within the gunwale.
Figure 3:
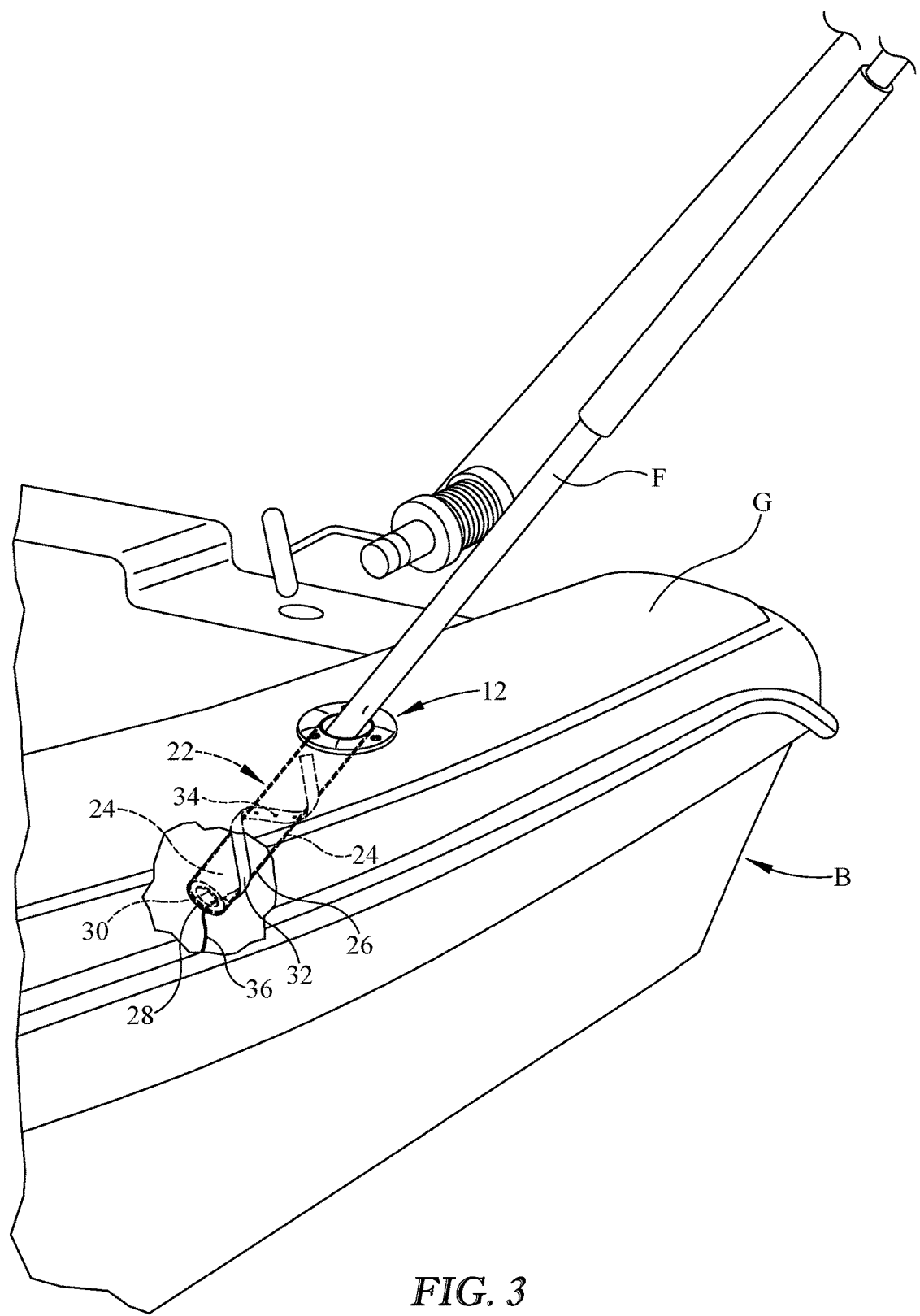
FIG. 3 is a perspective view of the lighted fishing pole holder, installed within a gunwale, having a fishing pole received therein.
Figure 4:
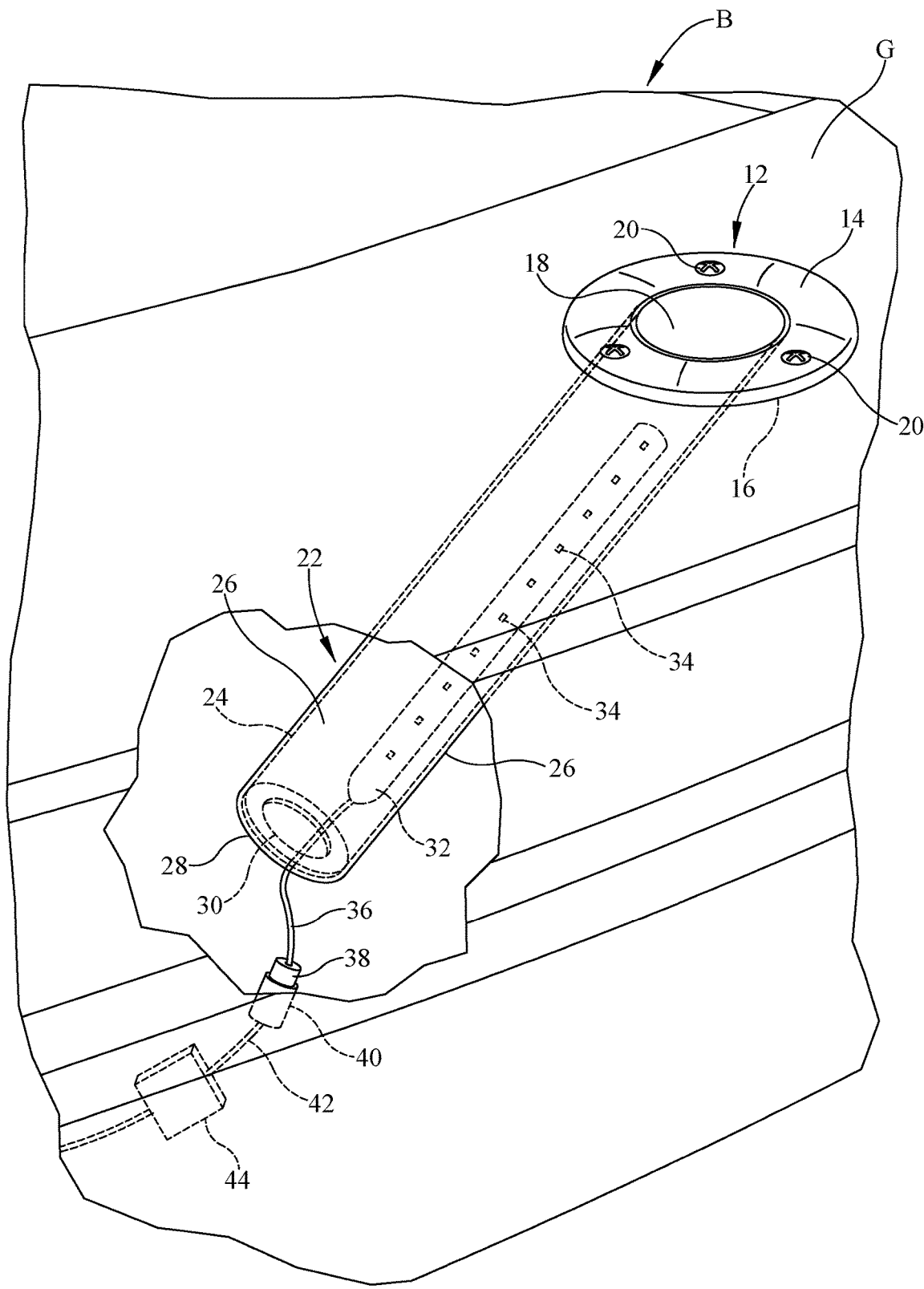
FIG. 4 is a close-up perspective view of the fishing pole holder installed within the gunwale, illustrating a different light configuration.

Referring now to the drawings, it is seen that the lighted fishing pole holder of the present invention, generally denoted by reference numeral 10, is comprised of a top mount 12 that has an upper surface 14, a lower surface 16, and a central opening 18. The top mount 12 is attached to the gunwale G of a boat B by placing the lower surface 16 of the top mount 12 onto the gunwale G (possibly within a recess (not illustrated) created therein for flush mounting) and is secured to the gunwale G in appropriate fashion such as by passing the illustrated screws 20 through the top mount 12 and into the gunwale G. A generally hollow tube member 22 depends downwardly from the lower surface 16 of the top mount 12, either generally straight down, or, as illustrated, at a desired angle. The tube member 22 is aligned with the central opening 18 of the top mount 12. As seen, the tube member 22 is generally cylindrical having an inner surface 24 and an outer surface 26 and has a bottom 28, which may have a small opening 30, as seen. The tube member 22 is generally transparent or translucent and is made from an appropriate material such as ABS plastic. The top mount 12 can be made from the same or similar material used to make the tube member 22 or from other appropriate material used to form a top mount. The top mount 12 is attached to the tube member 22 in appropriate fashion, depending on the material used to form the top mount 12 and the tube member 22.

As seen, a preferably flexible light strip 32 (also known by various names such as light tape, LED tape, ribbon light, light rope, etc.,) is attached to the outer surface 26 of the tube member 22 in appropriate fashion so that the individual lights 34 of the light strip 32 face inwardly into the tube member 22. The lights 34 can be an appropriate illumination device, such as LED lights. As seen, a first electrical cord 36 extends from the lower end of the light strip 32 and passes through the opening 30 on the bottom 28 of the tube member 22 (or through a small opening (not illustrated) on the sidewall of the tube member 22). An appropriate first plug 38 is located on the end of the first electrical cord 36. A second electrical cord 40 has one end tied into the electrical system of the boat B (electrical connection not illustrated) and has a second electrical plug 42 on the opposing end—of course the fishing pole holder 10 need not necessarily be connected to the boat's electrical system and can simply be battery operated (battery not illustrated). The first plug 38 and the second plug 42 couple with one another to form an electrical connection. A control box 44 may be located along the length of the second electrical cord 40.

A remote control 46 is also provided.

In order to use the lighted fishing pole holder 10 of the present invention, the fishing pole holder 10 is installed within the gunwale G of the boat B in the usual way. During installation, the first electrical plug 38 and the second electrical plug 42 are coupled together to form an electrical connection thereby connecting the light strip 32 to a source of electrical power (typically 12 volts DC). The remote control 46 is used to operate the lights 34 of the light strip 32. Such control can be, in the simplest form of the lighted fishing pole holder 10, as simple as turning the lights 34 on and off. The control box 44 can be more sophisticated so that the lights 34 can be made to cascade, to flash, to act as a light organ (microphone not separately illustrated but located on the control box 44 or other appropriate location), change colors if the lights 34 if the lights 34 come in more than one color, change intensity, give a preprogrammed light show of appropriate choreography, etc., with appropriate control buttons on the remote control 46 being used for such purpose. If multiple lighted fishing pole holders 10 are installed on the boat B, then each such lighted fishing pole holder 10 can have its own control box 44 or some or all of the lighted fishing pole holders 10 can be controlled from a common control box 44. If more than one control box 44 is used, then a single remote control 46 can be used to control all of the control boxes 44, appropriate addressing capability being resident on the remote control 46, or each control box 44 can be paired with its own remote control 46. The light L issued by the lights 34 of the light strip 32 emanate out of the central opening 18 of the top mount 12.

Of course the remote control 46 can be dispensed with and simple switch(es) can be used to control the lights 34 of the light strip 32.

The lighted fishing pole holder 10 can be equipped with a strike detector (not illustrated) that detects when a fish strike is registered on the fishing pole F being held within the fishing pole holder 10 wherein such strike detector is coupled to the control box 44 so that when a strike is detected, a signal is sent to the control box 44 so that the control box 44 can control the lights 34 on the light strip 32 in appropriate fashion, such as turning the lights 34 on, or if already on, changing their color, making them flash, increasing their light intensity output, etc., in order to alert a user of the strike on the line.

While the invention has been particularly shown and described with reference to an embodiment thereof, it will be appreciated by those skilled in the art that various changes in form and detail may be made without departing from the spirit and scope of the invention.

We claim:

1. A fishing pole holder comprising:
   a top mount having an upper surface, a lower surface, and a central opening, the top mount adapted to be attached to a gunwale of a boat;
   a transparent or translucent tube member having a top, a bottom, an outer surface, and an inner surface, such that the top of the tube member is attached to the lower surface of the top mount and aligned with the central opening, the tube member extending downwardly below a lower surface of the gunwale; and
   a light tape that is an elongate flexible strip member having an upper surface and a corresponding lower surface, a first end, and a corresponding second end, joined by a pair of parallel side member such that the upper surface has a series of lights thereon, the upper surface adhesively attached to the outer surface of the tube member so that the series of lights faces into the tube member, the light strip connected to a source of electrical power for powering the lights.

2. The fishing pole holder as in claim 1 wherein each of the series of lights is an LED light.

3. The fishing pole holder as in claim 1 further comprising:
   a control box electrically connected to the light strip, the control box controlling operation of the series of lights via one or more control signals; and
   a remote control that wirelessly communicates with the control box such that the remote control wirelessly sends remote signals to the control box for issuing the one or more control signals.

4. The fishing pole holder as in claim 3 wherein each of the series of lights is an LED light.

\* \* \* \* \*